United States Patent
Greene

(10) Patent No.: US 10,529,139 B1
(45) Date of Patent: Jan. 7, 2020

(54) SYSTEM, METHOD, AND APPARATUS FOR AVATAR-BASED AUGMENTED REALITY ELECTRONIC MESSAGING

(71) Applicant: Jeremy Greene, Sherman Oaks, CA (US)

(72) Inventor: Jeremy Greene, Sherman Oaks, CA (US)

( * ) Notice: Subject to any disclaimer, the term of this patent is extended or adjusted under 35 U.S.C. 154(b) by 7 days.

(21) Appl. No.: 16/106,574

(22) Filed: Aug. 21, 2018

(51) Int. Cl.
*G06T 19/00* (2011.01)
*G06T 13/40* (2011.01)
*G06F 3/0484* (2013.01)
*H04L 29/06* (2006.01)
*H04L 12/58* (2006.01)
*G06Q 30/06* (2012.01)

(52) U.S. Cl.
CPC ........ *G06T 19/006* (2013.01); *G06F 3/04842* (2013.01); *G06Q 30/0643* (2013.01); *G06T 13/40* (2013.01); *H04L 51/32* (2013.01); *H04L 67/38* (2013.01)

(58) Field of Classification Search
CPC ........ G06T 19/006; G06T 13/40; H04L 51/32
See application file for complete search history.

(56) References Cited

U.S. PATENT DOCUMENTS

| | | | |
|---|---|---|---|
| 9,397,972 B2* | 7/2016 | Bruns-Bielkowicz | H04L 51/10 |
| 10,116,604 B2* | 10/2018 | Bruns | H04L 51/10 |
| 2017/0098332 A1* | 4/2017 | Knight | G06T 19/006 |
| 2018/0350155 A1* | 12/2018 | Norwood | A45D 44/005 |
| 2019/0096112 A1* | 3/2019 | Pao | G06T 17/00 |
| 2019/0171338 A1* | 6/2019 | Voss | G06T 13/40 |

* cited by examiner

*Primary Examiner* — Ryan R Yang
(74) *Attorney, Agent, or Firm* — Omni Legal Group; Omid E Khalifeh

(57) ABSTRACT

A system, method, and apparatus for avatar-based augmented reality electronic messaging provides for a plurality of avatars and avatar customization options, wherein a user may customize an avatar in an augmented reality environment, add audio file data, and send the customized avatar and the audio to a recipient as a customized avatar message. In some embodiments, the customized avatar message may be sent as a message bubble notification. The user may receive the customized avatar message and play it back in the recipient's augmented reality viewer. In some embodiments, the present invention may provide for bubble notifications and third-party avatars within the present invention's augmented reality field of view that may serve as starting points for geogamification functions, may direct users to an e-commerce platform, or may link to other content, such as an audio file, a video file, or social media content.

20 Claims, 4 Drawing Sheets

US 10,529,139 B1

SYSTEM, METHOD, AND APPARATUS FOR AVATAR-BASED AUGMENTED REALITY ELECTRONIC MESSAGING

GOVERNMENT CONTRACT

Not applicable.

CROSS-REFERENCE TO RELATED APPLICATIONS

Not applicable.

STATEMENT RE. FEDERALLY SPONSORED RESEARCH/DEVELOPMENT

Not applicable.

COPYRIGHT & TRADEMARK NOTICES

A portion of the disclosure of this patent document may contain material which is subject to copyright protection. This patent document may show and/or describe matter which is or may become trade dress of the owner. The copyright and trade dress owner has no objection to the facsimile reproduction by any one of the patent document or the patent disclosure, as it appears in the Patent and Trademark Office patent files or records, but otherwise reserves all copyrights and trade dress rights whatsoever.

TECHNICAL FIELD

The disclosed subject matter relates generally to electronic messaging, and more particularly, to a system, method, and apparatus for avatar-based augmented reality electronic messaging.

BACKGROUND

Many persons enjoy electronic messaging, which generally comprises text messaging, video messaging, or a combination of both. Most electronic messaging applications, however, limit the user experience to the world of the electronic device's screen. As electronic messaging applications enable users to express their personal thoughts and feelings, users are continually looking for new ways to personalize their electronic messages.

Avatars are, generally, digital character that in some way represent their owners within a digital world. Many avatars are rendered in three dimensions. An avatar can be a digital likeness of the user, an existing avatar selected by the user, or an existing avatar that the user has personalized. Avatars tend to be used in video games, but can be used in other electronic program as well. Typically, an avatar offers the user the ability to create a digital other-self that can interact with digital worlds. The user therefore experiences a vicarious sense of being in that digital world.

Augmented reality is an increasingly popular way of interacting with the world. Using a camera and an electronic device running an augmented reality software application, digital elements can be superimposed into the camera feed in real time and their position can be maintained within the camera feed even if the camera moves. This creates the impression that the digital element exists in the real world, even though its existence is limited to the device's screen. Augmented reality offers both users and companies new ways to interact with the world around them by laying digital elements into real-world environments.

What is needed therefore is an electronic messaging system that combines the expression abilities of electronic messaging (both text and video messaging) with the personalization of avatars and places the whole in an augmented reality environment.

Attempts to meet these needs have been made with varying degrees of effectiveness. For example, U.S. Patent Application Publication No. 2010/0115426, incorporated by reference herein it its entirety, discloses a system and method for dynamic and interactive avatars of social networking members for use in visually displaying interactions and activities within a messaging context. While this disclosure does provide for avatars in messaging programs, the avatars lack appropriate customization options, and this disclosure fails to provide for an augmented reality element.

Another attempt can be seen in the disclosure of U.S. Patent Application Publication No. 2015/0302652, incorporated by reference in its entirety herein, which generally discloses a pair of glasses and associated systems that give the user an augmented reality experience. While this disclosure provides for an augmented reality experience, it fails to provide for avatars or electronic messaging.

Another example is U.S. Patent Application Publication No. 2016/0277903, incorporated by reference in its entirety herein, which generally discloses a text messaging program that enables users to send audio files such as audio stickers in their text messaging threads. While this disclosure does provide for separate audio files within electronic messaging systems, it fails to pair those audio files with an avatar or to provide an augmented reality system.

As can be seen, a need exists for a system, method, and apparatus for avatar-based augmented reality electronic messaging.

SUMMARY

The present disclosure is directed to a system, method, and apparatus for avatar-based augmented reality electronic messaging that provides for a plurality of avatars and avatar customization options, wherein a user may customize an avatar in an augmented reality environment, add audio file data, and send the customized avatar and the audio to a recipient as a customized avatar message. In some embodiments, the customized avatar message may be sent as a message bubble notification. The user may receive the customized avatar message and play it back in the recipient's augmented reality viewer.

Within the augmented reality viewer of the present invention, a user may also encounter avatars and bubble notifications of various types. Both avatars and bubble notifications, in some embodiments, may have messaging, e-commerce, and/or geogamification applications. The user may also encounter augmented reality social networking links or content, traditional videos, clickable audio clips, and so forth in various representations within the augmented reality viewer as well.

Bubble notifications may comprise message bubble notifications, augmented reality advertisement and shopping bubble notifications ("augmented reality shopping" bubble notifications), and geogamification bubble notifications. In some embodiments, augmented reality shopping bubble notifications within the augmented reality field of view may provide advertising and/or click-through links to an e-commerce platform where users can purchase goods and services. Similarly, in some embodiments, a user may encounter geogamification bubble notifications that may provide the starting points for geogamification functions and experiences. As well, in some embodiments, a user may click on other types of bubble notifications and engage with social media content, watch a video, hear an audio clip, visit a non-commercial webpage, and so forth. In addition to a traditional circle or sphere shape, bubble notifications may be of any shape, size, degree of opaqueness, or design capable of being viewed in augmented reality.

In some embodiments, one or more avatars may be visible within the augmented reality viewer and that may have the same or similar functions as bubble notifications, namely, may serve as message avatars, augmented reality shopping avatars, and geogamification avatars. Similarly, a user may select an avatar to receive a message, engage augmented reality shopping advertisements and/or e-commerce shopping, begin a geogamification event, engage with social media content, watch a video, hear an audio clip, visit a non-commercial webpage, and so forth. An avatar that is not a messaging avatar may at times be referred to as a "third-party" avatar herein. Avatars may also be of any size, shape, degree of opaqueness, or design capable of representation within augmented reality.

One or more of the above-disclosed embodiments, in addition to certain alternatives, are provided in further detail below with reference to the attached figures. The disclosed subject matter is not, however, limited to any particular embodiment disclosed.

Figure 1:
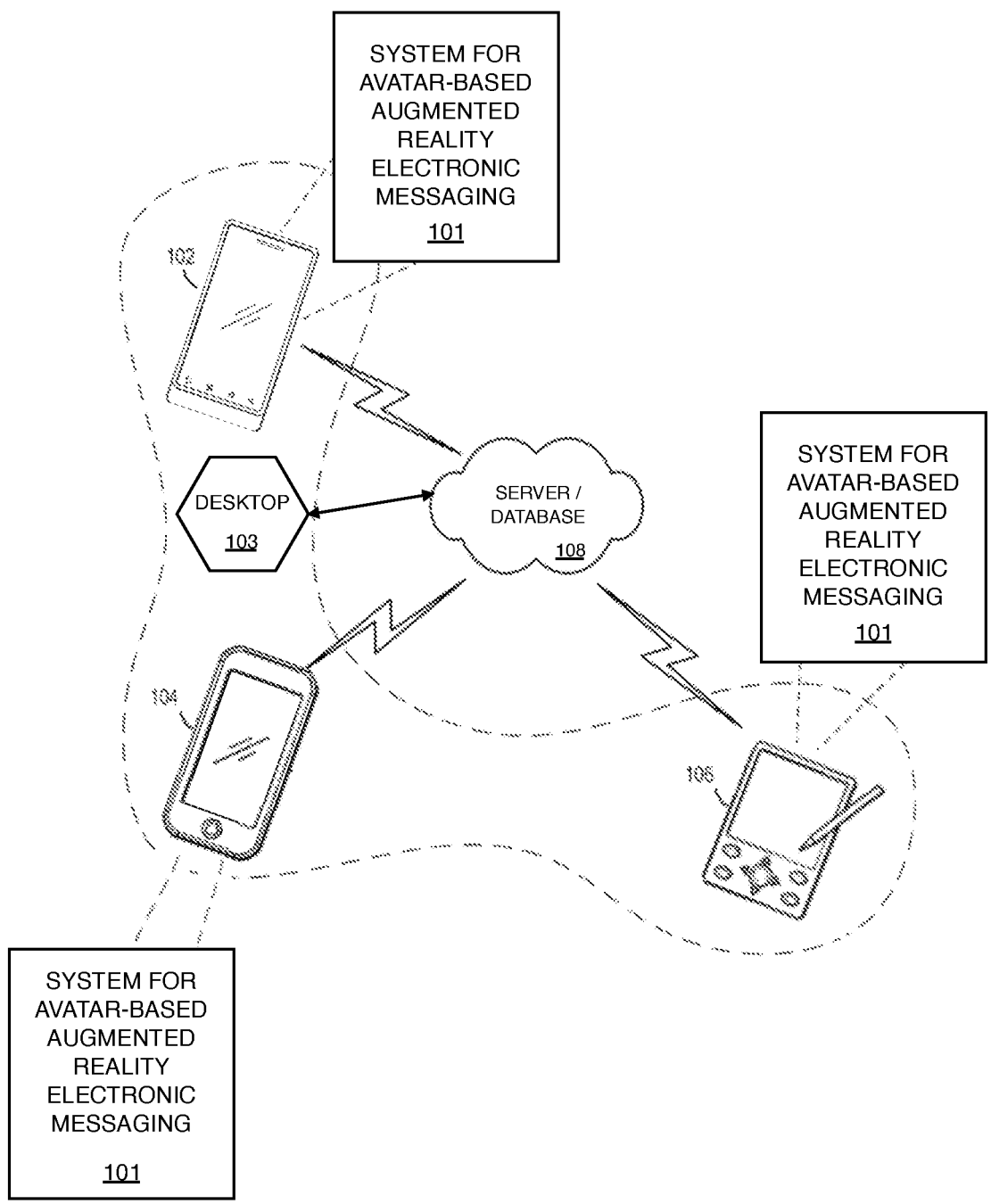
FIG. 1 is a block diagram of a networked environment in which an exemplary embodiment of a system for avatar-based augmented reality electronic messaging is implemented.

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "couple," "coupled," "couples," "coupling," and the like should be broadly understood and refer to connecting two or more elements or signals, electrically, mechanically or otherwise. Two or more electrical elements may be electrically coupled, but not mechanically or otherwise coupled; two or more mechanical elements may be mechanically coupled, but not electrically or otherwise coupled; two or more electrical elements may be mechanically coupled, but not electrically or otherwise coupled. Coupling (whether mechanical, electrical, or otherwise) may be for any length of time, e.g., permanent or semi-permanent or only for an instant.

In some embodiments, storage of one or more avatars, augmented reality software applications or data, videos, text, audio, clip art, animated files, messaging stickers, and other elements of electronic messaging (collectively, "electronic messaging data") may be stored in a block chain-like database comprising a series of interconnected nodes, which may be mobile electronic devices, that act as a dispersed, cloud-like storage system, a distributed ledger, or both.

DETAILED DESCRIPTION

Having summarized various aspects of the present disclosure, reference will now be made in detail to that which is illustrated in the drawings. While the disclosure will be described in connection with these drawings, there is no intent to limit it to the embodiment or embodiments disclosed herein. Rather, the intent is to cover all alternatives, modifications and equivalents included within the spirit and scope of the disclosure as defined by the appended claims.

In some embodiments, the present invention may comprise a system, method, and apparatus for avatar-based augmented reality electronic messaging. In some embodiments, the system may comprise a first electronic device associated with a user that is operative to determine a first location of the first electronic device; load an augmented reality software program; access a plurality of avatars stored in the memory; access a plurality of avatar customization options stored in the memory; receive at least one avatar selection chosen from among the plurality of avatars; receive at least one customization selection chosen from among the plurality of customization options; compile at least one first customized avatar, which is at least the at least one customization selection applied to the at least one avatar selection; engage the first electronic device's dual-facing camera in a front-facing mode; display a front-facing field of view; run the augmented software program such that the front facing field of view comprises an augmented reality field of view; receive at least one field of view location selection within the augmented reality field of view; display the at least one first customized avatar at the field of view location within the augmented reality field of view; animate the at least one first customized avatar at the field of view location; maintain the at least one first customized avatar at the field view location (even if the dual-facing camera moves); reorient the at least one dual-facing camera to a selfie field of view; receive a video-start input from the user; record a video taken by the dual-facing camera while the dual-facing camera is in the selfie field of view; receive a video-stop input from the user; identify at least one first audio file and at least one video file in the video; associate the at least one first audio file with the at least one first customized avatar; compile at least one first avatar message having at least one first audio file and the at least one first customized avatar; receive at least one recipient choice containing at least contact information for at least one recipient; and send the at least one first avatar message to the at least one recipient.

The system may further comprise a second electronic device associated with the recipient that may be configured to receive the at least one first avatar message; load its own (i.e. a second electronic device) augmented reality software program; display a second device augmented reality field of view; display the at least one first avatar message; receive a selection by the recipient of the at least one first avatar message; display the at least one customized avatar of the at least one first avatar message within the second device augmented reality field of view; and play the at least one audio file of the at least one first avatar message.

It should be noted that any mobile electronic device or desktop computer is contemplated to be capable of performing at least the functions of any other mobile device or desktop computer. Therefore, in any embodiment disclosed herein, the configurations and operative characteristics of the first electronic device and the second electronic device, and any other electronic device are presumed, unless otherwise specified, to apply to each other or to a third electronic device.

In some embodiments, the first electronic device (and therefore any electronic device) may also be configured to send the at least one first avatar message to the at least one recipient as at least one first message bubble notification.

Similarly, in some embodiments, the first electronic device may be configured to view at least one augmented reality shopping bubble notification in the augmented reality field of view; receive a touchscreen selection of the at least one augmented reality shopping bubble notification; load an e-commerce platform; and enable the user to shop on the e-commerce platform for at least one product or service. Relatedly, in some embodiments, the first electronic device may be configured to view at least one augmented reality shopping avatar in the augmented reality field of view; receive a touchscreen selection of the at least one augmented reality shopping avatar; load an e-commerce platform; and enable the user to shop on the e-commerce platform for at least one product or service.

More specifically, in some embodiments, first electronic device (or any electronic device, as described above), may be further operative to receive a touchscreen selection of the at least one augmented reality shopping bubble notification that may be associated with at least one commercial entity, load an e-commerce platform, and enable the user to shop on the e-commerce platform for at least one product or service associated with the commercial entity. In some embodiments, the present invention may utilize the augmented reality software and the customized avatars of the present invention to provide augmented reality shopping experiences. The present invention may provide that, through location tracking and beacon technology, brands can advertise products, services and special offers directly to users near their location. For example, in some embodiments, the present invention may utilize mobile electronic devices having GPS capability, which the present invention can use as a beacon to track users' locations, and can then (using the augmented reality software) place bubble notifications and/or avatars in augmented reality locations corresponding to real-world locations, which then enables the user to "find" them and access their contents, such as but not limited to directing the user to an e-commerce platform.

In some embodiments, the e-commerce platform may comprise a traditional shopping cart style system wherein horizontal rows of product or service offerings may be selected, after which the user may learn more about the product or service, add it to his or her cart, and checkout. In some embodiments, the present invention's e-commerce platform may provide users with a digital wallet, a proprietary currency (including cryptocurrency) and an e-commerce shopping profile. In some embodiments, the e-commerce platform of the present invention may represent the products and/or services as bubble notifications. In some embodiments, each bubble notification may comprise an avatar unique to or at least associated with the product or service being offered. In embodiments wherein the product or service is an enhancement to an avatar, the e-commerce platform may enable the user to perceive the change in status to the avatar both inside the e-commerce platform and in general use.

Relatedly, the present invention may support an existing or third-party e-commerce platform. In some embodiments, by clicking on a bubble notification, a user may be directed to the third-party e-commerce platform and may be provided with the opportunity to purchase the product or service, or to do other shopping on the e-commerce platform.

In some embodiments, the at least one augmented reality shopping bubble notification may be an augmented reality advertisement. An augmented reality advertisement may comprise one or more advertisements, such as but not limited to an avatar message where the subject (such as a paid performer, a celebrity, or an unpaid performer) pitches a product or service, or bubble notification-style advertisements for products, services and special offers that appear in an electronic device's augmented reality field of view. Augmented reality advertisements may also comprise, but are not limited to, one or more traditional advertising pieces such as a "floating" sign, a banner ad, a video, an animated image, one or more avatars customized to advertise a product, service, or special offer, both one or more avatars and one or more pieces of traditional advertising, or any other element that can be rendered in an augmented reality field of view. In some embodiments, such as embodiments running on mobile electronic devices that have touch screens, a user may touch on the augmented reality advertisement(s) to receive a coupon, points, status, further information, directions, new product offerings, upcoming product offerings, celebrity endorsements of a product, company news, branded content, music videos, social media links, social media content, membership in a club, or downloadable files. Touching on an augmented reality advertisement may also direct a user to an e-commerce platform, whether an e-commerce platform of the present invention or a third-party e-commerce platform, as described more fully elsewhere herein.

As well, in some embodiments, the first electronic device may be further operative to view at least one geogamification bubble notification in the augmented reality field of view; receive a touchscreen selection of the at least one geogamification bubble notification; load a geogamification software program; and direct the user to at least one second location. Relatedly therefore, in some embodiments, the first electronic device may be further operative to view at least one geogamification avatar in the augmented reality field of view; receive a touchscreen selection of the at least one geogamification avatar; load a geogamification software program; and direct the user to at least one second location. In some embodiments, one or more achievements may be associated with an electronic device reaching a particular location while the geogamification software is running.

In embodiments, the present invention may provide one or more geogamification software programs or applications in conjunction with the augmented reality software and the customized avatars of the present invention for geogamification purposes. "Gamification" uses game-based activities to motivate users into higher levels of engagement, typically in non-game contexts such as the present invention's augmented reality messaging environment. Gamification software programs draw on upon users' natural instincts to compete, to set and achieve goals, to obtain status, and to pursue rewards. By leveraging some of the features used in real games, gamification software programs can turn other types of activities into games and harness these instincts to produce a desired behavior.

Geogamification, therefore, draws upon the afore-mentioned user instincts to move users from place to place in the real world. As an example of geogamification software in practice in connection with the present invention, the present invention might place a customized avatar, using the augmented reality software, on a fountain in Central Park in digital form within the augmented reality. Users might be informed of this fact, and might move themselves to Central Park where, using their augmented reality field of view, they might perceive the customized avatar in that location. Such activity could also, in turn, unlock an interactive advertisement at that location. In other embodiments, by reaching the location a user may unlock an activity, such as a game or a test of knowledge or skills in order to unlock a prize or offer. In some embodiments, a series of geogamification elements may be used in sequence, such as but not limited to a treasure hunt, an obstacle course, a timed route, and so forth. In some embodiments, users may collect avatars by progressing from location to location. The present invention may also reward users who achieve geogamification success with status and influence across the present invention or with other users.

In some embodiments, the at least one first avatar message may further comprise the at least one video file, and the second electronic device may be further operative to play both the at least one audio file and the at least one video file of the at least one first avatar message.

In some embodiments, the first electronic device, the second electronic device, or any electronic device, may be further configured to associate the at least one video file with the at least one first customized avatar; extract at least one user movement by the user captured in the video file of the selfie video; create at least one avatar movement sequence file comprising at least one movement by the at least one first customized avatar that mimics the at least one user movement; and compile the at least one first audio file, the at least one avatar movement sequence file, and the at least one first customized avatar into the at least one first avatar message. The second electronic device may be configured to play the at least one audio file and the at least one avatar movement sequence file of the at least one first avatar message.

As an example of the above, the present invention may scan the video file, identify at least one subject of the file (generally the user), and identify, isolate, and extract the movements of the subject. Then, the present invention may apply or "map" these movements onto the customized avatar and cause the customized avatar to move in a similar fashion (the avatar movement sequence). Then, the present invention may associate the audio file with the customized avatar and its avatar movement sequence, and compile these, as well as in some embodiments additional files or data, into the first avatar message. The end product then comprises a first avatar message that appears in the second user's augmented reality field of view, plays back the audio file, and moves the customized avatar according to the avatar movement sequence. For example, and by way of non-limiting illustration, in the video, the subject may wave to the camera and say "hello." When the second user initiates playback in the second user's augmented reality field of view, the second user may hear the audio file of "hello" played while watching the customized avatar wave.

Additionally, in some embodiments, the customized avatar may be configured to interact with real world items that may be identified within the augmented reality field of view by the augmented reality software or another element of the present invention. For example, in some embodiments, the customized avatar may be placed on a desk within the augmented reality field of view. On the surface of the real-world desk there may be a real-world cup of coffee. In such embodiments, the customized avatar may appear to be picking up and drinking the cup of coffee in the augmented reality field of view. Additionally, in some embodiments, when the avatar-based electronic message containing the customized avatar of the previous example is sent to a recipient, the customized avatar may appear to be drinking the cup of coffee or otherwise making the same gestures during playback in the recipient's augmented reality field of view. Similar interactions of the avatar and any object in the augmented field of view are also contemplated, such as drinking from a water fountain, jumping off a surface, answering a phone, and so forth.

FIG. 1 illustrates an exemplary embodiment of the present invention which includes a plurality of electronic devices communicatively coupled to one another. By way of example, and not limitation, FIG. 1 illustrates mobile devices 102, 104, and 106, and desktop computer 103 that incorporate a system for avatar-based augmented reality electronic messaging 101 and are communicatively coupled via a communications network 108. Each of the mobile devices may be embodied as a mobile computing device such as, for example and without limitation, a smartphone or tablet computer that incorporates cellular telephone functionality. Notably, the communications network 108 can use one or more of various communications types such as, for example and without limitation, cellular and Wi-Fi communications, local area networks (LANs), wide area networks (WANs), client services, content services, and Avatar Messaging Services (AMS). In some embodiments, one or more mobile devices (not pictured) may take the place of one or more of mobile devices 102, 104, and 106, and desktop computer 103. Each of mobile devices 102, 104, and 106, and desktop computer 103 may comprise an electronic device having at least a touchscreen, having, at least, a dual-facing camera, a GPS location, a memory, wireless data transfer capability, and a microphone, as may be more fully discussed elsewhere herein. Moreover, in some embodiments, one or more of mobile devices 102, 104, and 106, and desktop computer 103 may communicate via short-distance device-to-device data transfer (i.e. Bluetooth).

Users of desktop computer 103 and mobile devices 102, 104, and 106 may be users of at least one network 110 known to those skilled in the art. For instance, as noted above, network 110 may comprise a peer-to-peer network, a cloud-based computing network, a fog computing network, a blockcloud computing network, or any other network 110 known in the art capable of secure data transfer. In some embodiments, network 110 may be facilitated by a website that may require a registration and login prior to use.

Figure 2:
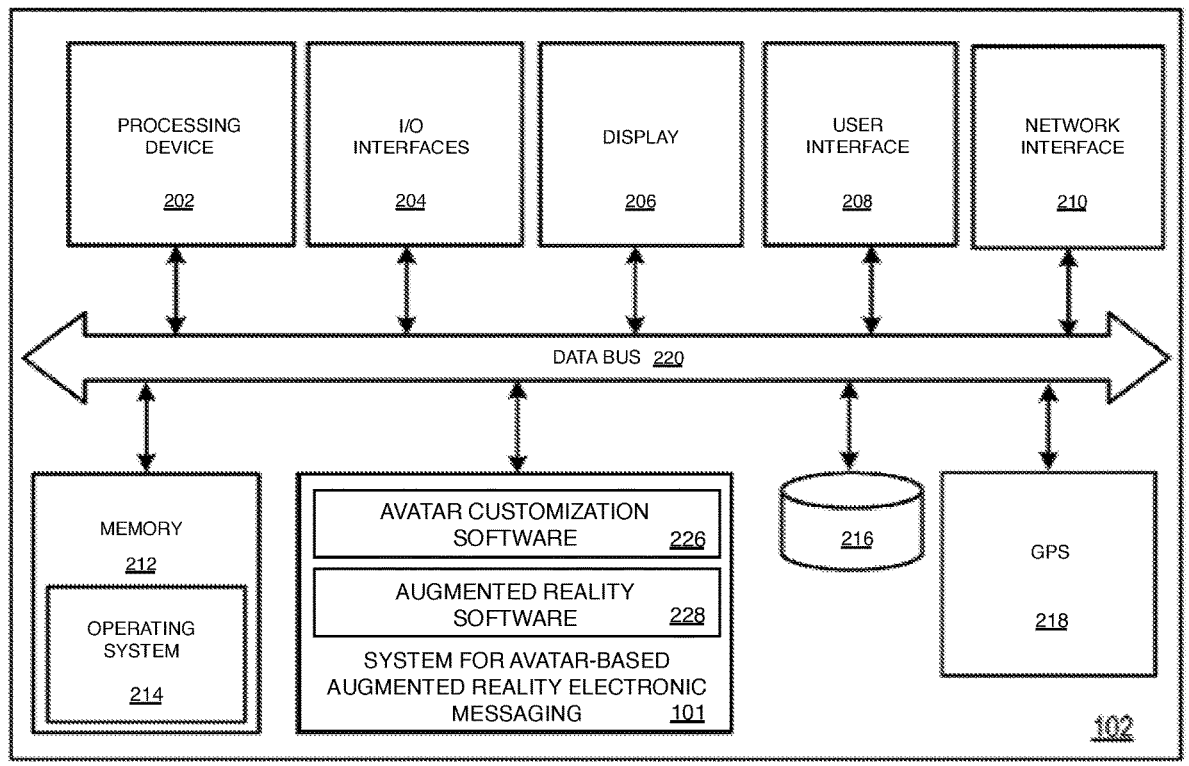
FIG. 2 illustrates an exemplary embodiment of a mobile device shown in FIG. 1.

FIG. 2 illustrates at least one mobile device 102, wherein each mobile device 102 may, in some embodiments, comprise a networked computer system within electronic messaging data chain-configured database 108. In some embodiments, mobile devices 102, 104, and 106, and desktop computer 103 may, in addition to their roles as either a first electronic device or a second electronic device, may alternatively or simultaneously comprise at least one mobile device 102.

In the embodiment depicted in FIG. 2, mobile device 102 may comprise, at least, at least one processing device (processor) 202, at least one input/output interface 204, at least one display 206, at least one user interface 208, at least one network interface 210, at least one memory 212, at least one operating system 214, at least one mass storage 216 and at least one GPS 218, with each communicating across a local data bus 220. Additionally, at least one mobile device 102 may create and store at least one user avatar program 226 and may run at least one augmented reality software application 228.

In some embodiments, a distributed electronic messaging data chain computer system may provide that each mobile device 102 may communicate with one or more mobile devices 102, and in some embodiments all other mobile devices 102. Additionally, in some embodiments, one or more elements of mobile device 102 may be absent in any particular mobile device 102 or shared across one or more mobile devices 102. By way of illustration and not limitation, the present invention may access memory 212 and/or operating system 214 stored partially or completely across several mobile devices 102.

The processing device 202 may include any custom made or commercially available processor, a central processing unit (CPU) or an auxiliary processor among several processors associated with mobile device 102, a semiconductor based microprocessor (in the form of a microchip), a macroprocessor, one or more application specific integrated circuits (ASICs), a plurality of suitably configured digital logic gates, and other electrical configurations comprising discrete elements both individually and in various combinations to coordinate the overall operation of the system.

The memory 212 can include any one of a combination of volatile memory elements (e.g., random-access memory (RAM, such as DRAM, and SRAM, etc.)) and nonvolatile memory elements. The memory typically comprises native operating system 214, one or more native applications, emulation systems, or emulated applications for any of a variety of operating systems and/or emulated hardware platforms, emulated operating systems, etc. For example, the applications may include application specific software which may comprise some or all the components of mobile device 102. In accordance with such embodiments, the components are stored in memory and executed by the processing device. Note that although depicted separately in FIG. 2, the system, method, and apparatus for avatar-based augmented reality electronic messaging 100 may be resident in memory such as memory 212. As mentioned above, in some embodiments, one or more mobile devices 102 may not have their own memory 212 and/or operating system 214 or may store incomplete memory 212 and/or operating system 214, and may therefore draw upon other mobile devices 102 for use of one or more memory units 212 and/or operating system elements 214 via mobile device 102 to mobile device 102 communication 228, as discussed herein.

User interface 208 may be configured to detect contact within the display area of the display 206 and may provide such functionality as on-screen buttons, menus, keyboards, etc. that allows users to navigate user interfaces by touch. User interface 208 may also be a keyboard, a mouse, a microphone, a vision tracking system, a motion-capture system, a trackball, or any other known interface with a computing system. For some embodiments, mobile device 102 may also comprise GPS 218 or other means to determine the location of the mobile device 102.

One of ordinary skill in the art will appreciate that the operating system 214 can, and typically will, comprise other components which have been omitted for purposes of brevity. Note that in the context of this disclosure, a non-transitory computer-readable medium stores one or more programs for use by or in connection with an instruction execution system, apparatus, or device. With further reference to FIG. 2, network interface device 210 comprises various components used to transmit and/or receive data over a networked environment such as depicted in FIG. 1. When such components are embodied as an application, the one or more components may be stored on a non-transitory computer-readable medium and executed by the processing device.

In order to facilitate the aforementioned functionality, various aspects may be performed by one or more of desktop computer 103 and/or mobile devices 102, 104, and 106, or any mobile device 102 which may be but is not limited to desktop computer 103 and/or mobile devices 102, 104, and 106. In one embodiment, the desktop 103, mobile devices 102, 104, and 106, and/or any mobile device 102 are operative to perform, at least in part, the method depicted in the flowchart of FIG. 3 and described above.

Figure 3:
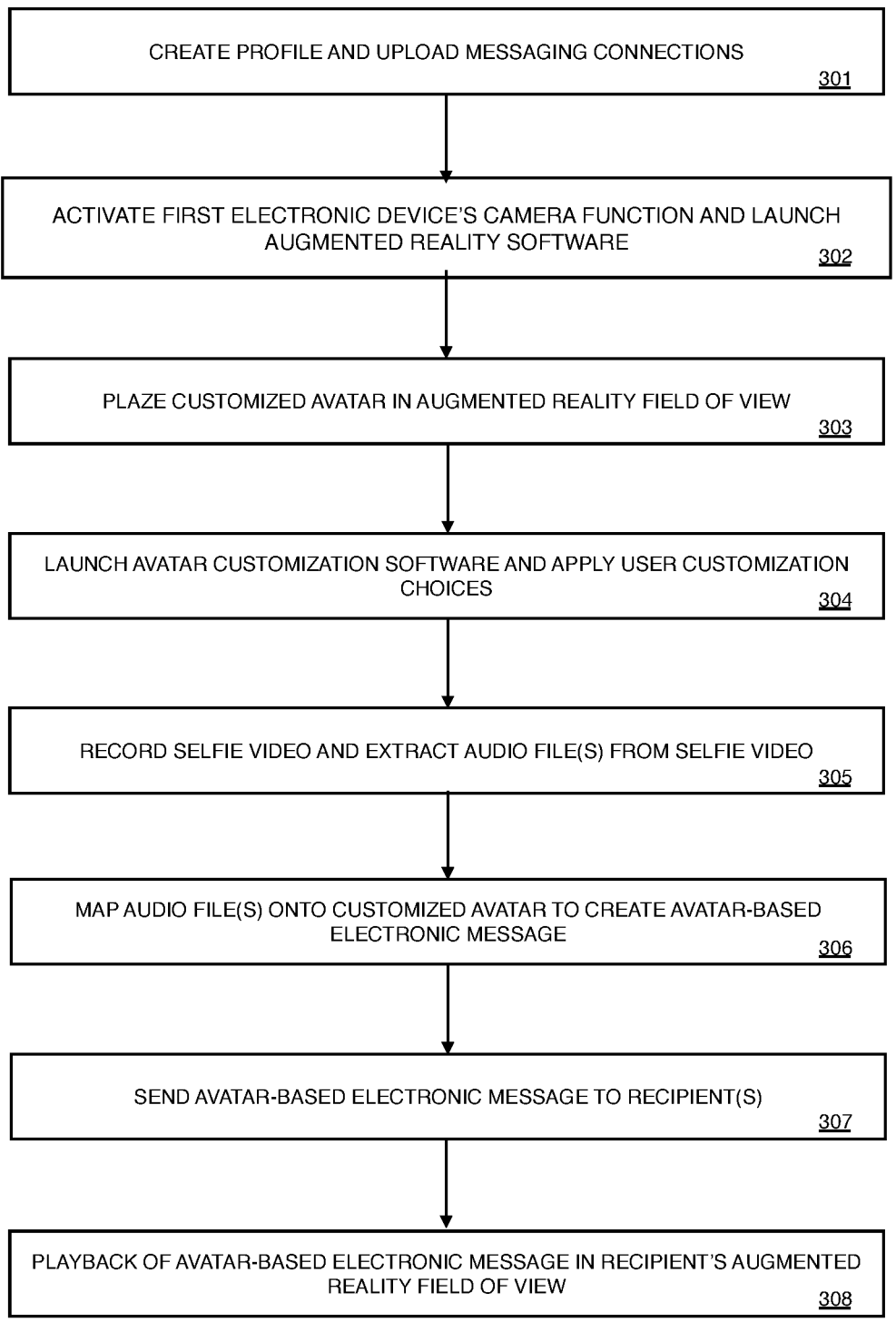
FIG. 3 is a flowchart depicting an exemplary embodiment of a method for avatar-based augmented reality electronic messaging.

Turning attention to FIG. 3, an exemplary method for avatar-based augmented reality electronic messaging is disclosed. First, a user may create a profile and upload the user's messaging connections to the present invention 301.

The process wherein the present invention may enable a user to create a profile and upload the user's messaging connections to the present invention 301 may comprise one or more non-limiting steps. In order to create a profile and upload messaging contacts, a user may first open the application on an electronic device, then launch the application. Notably, at any point, the present invention may take the user to any other step or sequence of the present invention. From the home screen, the system may next ask the user to enable the electronic device's camera and connect the device to the internet and any appropriate server. The present invention may then bring the user through several account creation steps. First, the present invention may provide terms of service, a welcome video, receive basic information from the user such as name, gender, age, and location, enable the user to create an account, then assign the user a profile icon. The present invention may then show the viewer a video from the present invention's team, followed by a tutorial that describes how to create and share an avatar-based electronic message, as described more fully herein.

Next, the user may compile a list of the user's potential message recipients and connections. In some embodiments, these connections may be drawn from a user's contacts list, a user's social media profiles (such as Facebook®, Instagram®, Snapchat®, etc.), friend requests via the present invention, or another source of user connections. If the user has no friends, the present invention may direct the user to an add-friends page, as well as to a page wherein the user may choose to accept friend requests. If the user has not enabled the present invention to access the user's social media account(s), the present invention may direct the user to an add-social media account access page wherein the user may be prompted to enable access. If the user has not enabled the present invention to access the user's contacts list(s), the present invention may direct the user to an add-contacts list(s) page wherein the user may be prompted to enable access. The present invention may then, or in some embodiments only if selected by the user, take the user through one or more settings menus, which may include views or reviews of the user's timeline, alerts and alert options, profile settings, a list of the user's friends, terms of service, a list of blocked users (if any), the user's email and password on file with the present invention, and any settings or information usually included in settings pages of messaging applications.

Next the present invention may activate a first electronic device's camera function and launch augmented reality software 302. Augmented reality software, generally, accesses the video feed of a camera and places one or more digital or virtual objects within the camera's field of view and maintains the object's positioning and characteristics despite movements by the camera and changes to the field of view. A camera's field of view upon which augmented reality software is acting or active may be called herein an "augmented reality field of view."

Next, the present invention may place the customized avatar in the camera's augmented reality field of view 303. The present invention may also animate the customized avatar, such as but not limited to causing the avatar to shift its weight, look around, or periodically make simple gestures. Once the customized avatar has been placed in the augmented reality field of view 303, the present invention may maintain the relationship in size between the avatar and the real-world objects shown in the augmented reality field of view if and when the camera's field of view is moved, such as from right to left.

The present invention may then launch an avatar customization software application and apply user customization choices 304. In some embodiments, the avatar customization software may provide for multiple avatars that a user may select and modify or customize within the augmented reality viewer and/or in augmented reality. Generally, the avatars may comprise male and female human likenesses or cartoons, but need not be restricted to human-shaped avatars. Some avatars may resemble known non-human objects, whether real or imaginary, such as but not limited to a cartoon version of a human face or likeness, an animal shape such as but not limited to a monkey, lion, rabbit or a dog, an object such as a banana, tree, flower, star, sun, or moon, a rocket ship or train, half-human-half-animals, chimeras, creatures, insects, aliens, dragons, demons, dolls, an accessory such as a cowboy hat or purse, an emoji, a thumbs-up, a shape such as a sphere or cube, a plurality of shapes of varying sizes, and so forth. Some avatars may resemble a sweet treat such as a popsicle, gummy bear, ice cream cone, scoop of ice cream, cone, chocolate chip, brownie, cookie, a candy or candy bar, a dessert topping, or another sweet treat or combination of sweet treats. Some avatars may resemble a savory treat such popcorn, small slices of pizza, a meatball, a meatball sandwich, small slices of bacon, cereal, and so forth. As may be imagined, any visually representable element, and any equivalent or alternative of any element named herein, whether real, fictional, known, unknown or hypothesized, is capable of representation as an avatar by the present invention.

To use the non-limiting example of an avatar shaped as a woman, the present invention may provide for more than one body type, skin color, hair style, hair length and color, eye shape, nose shape, mouth shape, eyebrows shapes, ears shape, eye color, face shape, top clothing, bottom clothing, shoes, sock, glove, ring, earring, necklaces, hat, other accessory such as a purse, handheld music player, knee brace, or crutches, sunglasses, monocle, goggles (including night vision goggles), mobile phone, tablet, visor, weapon, branded apparel, hair accessory such as a beret or hair tie, a tattoo or piercing, cavity (such as a heart-shaped hole), enlargement (such as big hands or big heads) and any known variation or modification of female human beings or their appearance that is capable of visual representation. For example, for "eye color," all known eye colors are contemplated. Or for "handheld music player," such as but not limited to any handheld sound machine is contemplated, from the classic rectangular boom box having two speakers on the front and a tape deck to an mp3 player or a mobile phone is contemplated. Or for example, for "glove," any hand-covering such as but not limited to mittens, a baseball glove, a white glove with rhinestones, an oven mitt, a surgical glove, and so forth is contemplated.

Using the avatar customization software, the user may apply customization choices to an avatar 304 in augmented reality within the augmented reality viewer. In some embodiments, the present invention may provide a library of avatars, a library of customization options, and on-screen tools that show a user how to modify the avatar using the customization options. For example, to edit an avatar, the present invention may provide "views" wherein a user may select avatar "physical" features options, animation options, text options, apparel options, audio options, and other creator customization options. Once an avatar has been customized, in some embodiments, the customized avatar may be saved to the library of the user, all users, or both. In some embodiments, some avatars in the avatar library may be already customized, such as but not limited to an avatar customized to look like a celebrity or a person of a particular occupation, such as a construction worker, a nurse, a professional athlete, a streetwise hustler or a business executive. For example, the user who selects a female avatar may begin by selecting the general body style of the avatar, then move on to selecting the avatar's skin tone, facial features, clothing, hair and hairstyle, accessories, and so forth. This particular customized avatar may be saved in the user's avatar library or added to a library accessible by more than one user.

Following this, the present invention may then enable a user to push a button on the mobile device's screen that initiates a video recording. The present invention may then turn the device's camera function to a selfie-facing direction, record a selfie, and extract one or more audio files from the selfie video data 305. Next, the present invention may map the extracted audio file onto the customized avatar to create an avatar-based electronic message 306. The phrase "map onto," as used herein, means simply to "connect with" or "link to." In such embodiments, the avatar-based electronic message may comprise one or more connected files send as a bundled package of files. In some embodiments, in some instances other embodiments, the present invention may compile the customized avatar and the one or more audio files into a new file that comprises an avatar-based electronic message.

Following the compilation of the avatar-based electronic message, the present invention may send the avatar-based electronic message to a recipient 307. Finally, the recipient, via the present invention, may also open up an augmented reality field of view on the recipient's electronic device, whereupon the avatar-based electronic message may be deposited within the augmented reality field of view and the present invention may play back the audio file(s) attached to or a part of the avatar-based electronic message within the augmented reality field of view 308. In some embodiments, the present invention may enable more than one avatar to be placed and, in some embodiments, to playback within a user's augmented reality field of view, a recipient's augmented reality field of view, or both.

In some embodiments, the present invention may map video files onto the customized avatar. This can be in addition to or substitution for the audio file(s). In such embodiments, image or video data may be extracted from the selfie video and mapped onto the customized avatar such that the customized avatar, when playback is initiated, mimics the gestures of the user as extracted from the video file. For example, and by way of illustration and not limitation, if the user smiles, waves, or dances in the video file, the present invention may extract that information from the video file, map it onto the customized avatar, and cause the customized avatar to similarly smile, wave, or dance during playback while the present invention is playing back the audio file(s) attached to or a part of the avatar-based electronic message within the augmented reality field of view 308.

Figure 4:
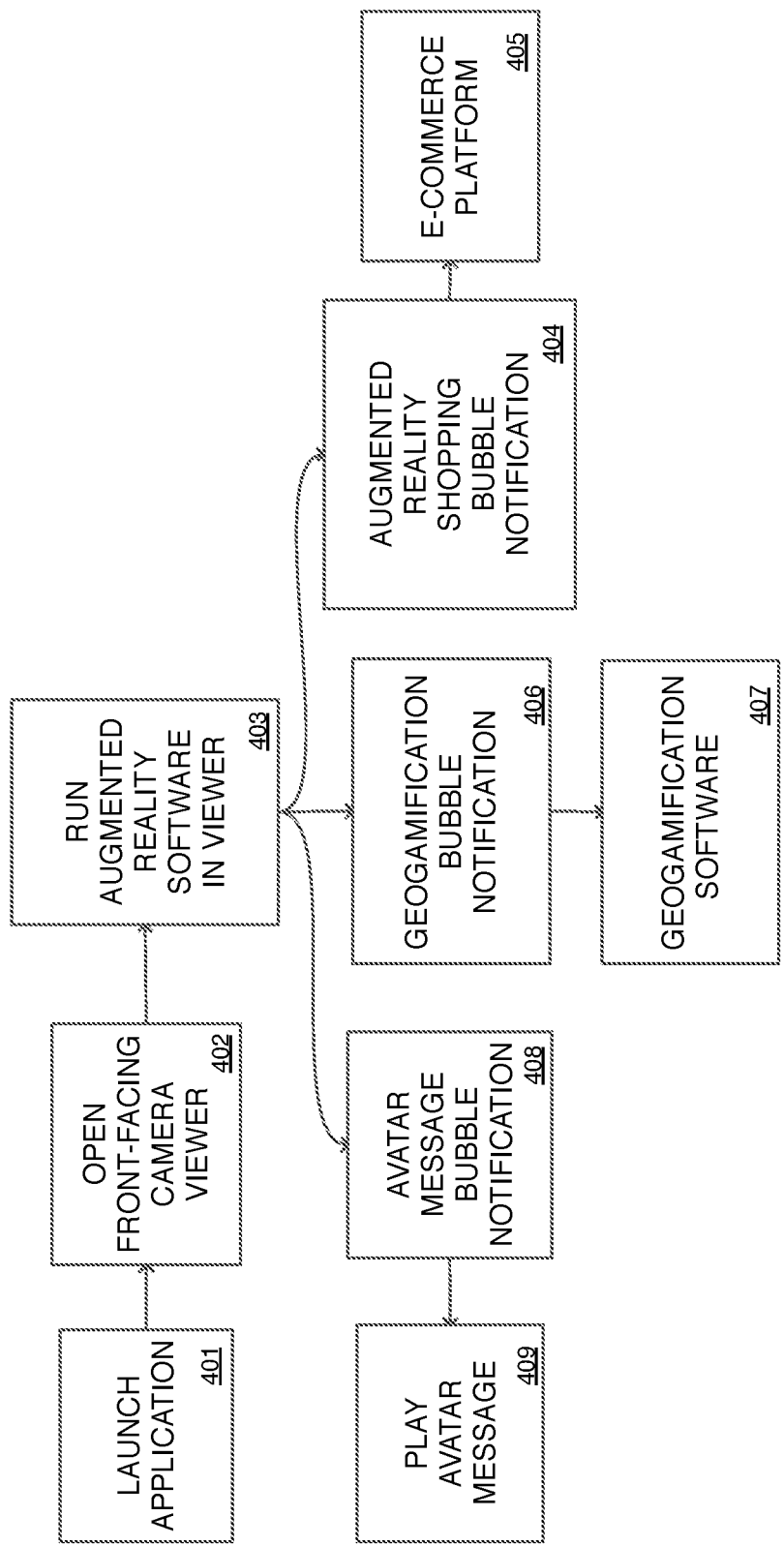
FIG. 4 is a flowchart depicting an additional exemplary embodiment of a method for avatar-based augmented reality electronic messaging.

In FIG. 4, a viewer may perceive a flowchart that generally discloses one or more additional details concerning an exemplary method for avatar-based augmented reality electronic messaging. In the embodiment disclosed, the present invention first launches the present invention as an application 401 on a suitable electronic device, such as but not limited to a mobile device. Next, the present invention may activate the electronic device's front-facing camera viewer 402. Then, the present invention may run augmented reality software on the electronic device such that augmented reality is supported within the camera's field of view (viewer) 403.

In some embodiments, the present invention may then display a bubble notification in the viewer. In some embodiments, a bubble notification may appear in the viewer in response to an incoming avatar message. In some embodiments, a bubble notification may appear in the viewer if the user "discovers" the bubble notification by aiming the camera, and therefore the viewer, at a point in space in which the augmented reality software has placed a bubble notification. For example, if the present invention were to place a bubble notification on the edge of a fountain, and a user were to approach with the user's viewer open, when the fountain came within the user's viewer, the bubble notification might appear in the viewer.

If the bubble notification is an augmented reality shopping bubble notification 404, the present invention may open and run an e-commerce platform 405, which in some embodiments may be the present invention's e-commerce platform 405. In some embodiments, the augmented reality shopping bubble notification 404 may direct the user to real-world product releases through virtual gamification. In some embodiments, user may be directed to visit strategic geographic locations to gain access to exclusive products and releases. In some embodiments (not shown), an augmented reality shopping bubble notification 404 may direct the user to the geogamification software 407. Moreover, in some embodiments, one or more augmented reality shopping bubble notification 404 may appear based on a user's location, through location tracking and beacon technology. In such embodiments, brands may be able to advertise product services and special offers directly to a user near their location by placing an augmented reality shopping bubble notification 404 at a suitable location.

If the bubble notification is a geogamification bubble notification 406, the present invention may open and run the geogamification software 407. As described elsewhere herein, the geogamification software 407 may direct the user to one or more locations and may reward the user for doing so. The geogamification software 407 may interface with both the augmented reality shopping bubble notification 404 and the e-commerce platform 405. For example, the geogamification software 407 may direct a user to an augmented reality shopping bubble notification 404. Or, the geogamification software 407 may direct a user to an avatar message bubble notification 408.

If the bubble notification is instead an avatar message bubble notification 408, when a user clicks on or otherwise selects the avatar message bubble notification 408 the present invention may play the avatar message 409. When an avatar message is played 409, in many embodiments the customized avatar may be displayed and at least one audio track may be played as well. In some embodiments, when an avatar message is played 409, the avatar may move or otherwise be animated. In some embodiments, when an avatar message is played 409, the avatar may move or otherwise be animated based on movements extracted from a video file of a message, as described elsewhere herein. Some augmented reality shopping bubble notifications 404 may be commercialized avatar messages 409, such as for example, a celebrity pitching a product in the form of an avatar message 409.

In some embodiments, all elements of user data, in the aggregate or individual, may be recorded and analyzed by the present invention. In some embodiments, the prevalence or nature of one or more avatars, bubble notifications, messaging applications, e-commerce platforms, or geogamification applications may be modified in response to the data. The data may be aggregated into a separate file system having, in some embodiments, a separate database.

If embodied in software, it should be noted that each block depicted in the accompanying flowcharts represents a module, segment, or portion of code that comprises program instructions stored on a non-transitory computer readable medium to implement the specified logical function(s). In this regard, the program instructions may be embodied in the form of source code that comprises statements written in a programming language or machine code that comprises numerical instructions recognizable by a suitable execution system such as desktop 103, mobile devices 102, 104, and 106, and/or any mobile device 102. The machine code may be converted from the source code, etc. If embodied in hardware, each block may represent a circuit or a number of interconnected circuits to implement the specified logical function(s).

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

CONCLUSIONS, RAMIFICATIONS, AND SCOPE

While certain embodiments of the invention have been illustrated and described, various modifications are contemplated and can be made without departing from the spirit and scope of the invention. Accordingly, it is intended that the invention not be limited, except as by the appended claim(s).

The teachings disclosed herein may be applied to other systems, and may not necessarily be limited to any described herein. The elements and acts of the various embodiments described above can be combined to provide further embodiments. All of the above patents and applications and other references, including any that may be listed in accompanying filing papers, are incorporated herein by reference. Aspects of the invention can be modified, if necessary, to employ the systems, functions and concepts of the various references described above to provide yet further embodiments of the invention.

Particular terminology used when describing certain features or aspects of the invention should not be taken to imply that the terminology is being refined herein to be restricted to any specific characteristics, features, or aspects of the present invention with which that terminology is associated. In general, the terms used in the following claims should not be constructed to limit the present invention to the specific embodiments disclosed in the specification unless the above description section explicitly define such terms. Accordingly, the actual scope encompasses not only the disclosed embodiments, but also all equivalent ways of practicing or implementing the disclosed present invention. The above description of embodiments of the present invention is not intended to be exhaustive or limited to the precise form disclosed above or to a particular field of usage.

While specific embodiments of, and examples for, the present invention are described above for illustrative purposes, various equivalent modifications are possible for which those skilled in the relevant art will recognize.

While certain aspects of the present invention are presented below in particular claim forms, various aspects of the present invention are contemplated in any number of claim forms. Thus, the inventor reserves the right to add additional claims after filing the application to pursue such additional claim forms for other aspects of the present invention.

The invention claimed is:

1. An apparatus for avatar-based augmented reality electronic messaging comprising at least a non-transitory, tangible computer-readable medium having stored thereon computer-executable instructions, which, when executed by one or more computer processors associated with a first electronic device, cause the one or more processors to:
   determine a first location of the first electronic device;
   load an augmented reality software program;
   access a plurality of avatars, wherein the plurality of avatars is stored in the memory;
   access a plurality of avatar customization options, wherein the plurality of avatar customization options is stored in the memory;
   receive at least one avatar selection, wherein the at least one avatar selection is at least one avatar selected by a user from the plurality of avatars;
   receive at least one customization selection, wherein the at least one customization selection comprises at least one customization option selected by the user from the plurality of customization options;
   compile at least one first customized avatar, wherein the at least one first customized avatar comprises at least the at least one customization selection applied to the at least one avatar selection;
   engage the dual-facing camera in a front-facing mode;
   display a front-facing field of view;
   run the augmented software program such that the front facing field of view comprises an augmented reality field of view;
   receive at least one field of view location selection, wherein the at least one field of view location is within the augmented reality field of view;
   display the at least one first customized avatar at the field of view location within the augmented reality field of view;
   animate the at least one first customized avatar at the field of view location;
   maintain the at least one first customized avatar at the field view location;
   reorient the at least one dual-facing camera to a selfie field of view;
   receive a video-start input from the user;
   record a video taken by the dual-facing camera while the dual-facing camera is in the selfie field of view;

receive at least one recipient choice, wherein the at least one recipient choice comprises at least the contact information for at least one recipient;
send the at least one first avatar message to the at least one recipient;
receive at least one second avatar message, wherein the at least one second avatar message appears in the augmented reality field of view as a bubble notification;
display the at least one second customized avatar of the at least one second avatar message within the augmented reality field of view.

2. The apparatus of claim 1, wherein the at least one first avatar message is sent to the at least one recipient as at least one first message bubble notification, and wherein the at least one second avatar message is received as at least one second message bubble notification.

3. The apparatus of claim 1, wherein the instructions as executed cause the one or more processors to be further operative to:
view at least one augmented reality shopping bubble notification in the augmented reality field of view;
receive a touchscreen selection of the at least one augmented reality shopping bubble notification;
load an e-commerce platform; and
enable the user to shop on the e-commerce platform for at least one product or service.

4. The apparatus of claim 1, wherein the instructions as executed cause the one or more processors to be further operative to:
view at least one geogamification bubble notification in the augmented reality field of view;
receive a touchscreen selection of the at least one geogamification bubble notification;
load a geogamification software program; and
direct the user to at least one second location.

5. The apparatus of claim 1, wherein the instructions as executed cause the one or more processors to be further operative to:
view at least one augmented reality shopping avatar in the augmented reality field of view;
receive a touchscreen selection of the at least one augmented reality shopping avatar;
load an e-commerce platform; and
enable the user to shop on the e-commerce platform for at least one product or service.

6. The apparatus of claim 1, wherein the instructions as executed cause the one or more processors to be further operative to:
view at least one geogamification avatar in the augmented reality field of view;
receive a touchscreen selection of the at least one geogamification avatar;
load a geogamification software program; and
direct the user to at least one second location.

7. A system for avatar-based augmented reality electronic messaging, comprising:
a) a first electronic device associated with a user, wherein the first electronic device is operative to:
determine a first location of the first electronic device;
load an augmented reality software program;
access a plurality of avatars, wherein the plurality of avatars is stored in the memory;
access a plurality of avatar customization options, wherein the plurality of avatar customization options is stored in the memory;
receive at least one avatar selection, wherein the at least one avatar selection is at least one avatar selected by a user from the plurality of avatars;
receive at least one customization selection, wherein the at least one customization selection comprises at least one customization option selected by the user from the plurality of customization options;
compile at least one first customized avatar, wherein the at least one first customized avatar comprises at least the at least one customization selection applied to the at least one avatar selection;
engage the dual-facing camera in a front-facing mode;
display a front-facing field of view;
run the augmented software program such that the front facing field of view comprises an augmented reality field of view;
receive at least one field of view location selection, wherein the at least one field of view location is within the augmented reality field of view;
display the at least one first customized avatar at the field of view location within the augmented reality field of view;
animate the at least one first customized avatar at the field of view location;
maintain the at least one first customized avatar at the field view location;
receive a video-start input from the user;
record a video taken by the dual-facing camera;
receive a video-stop input from the user;
identify at least one first audio file and at least one video file in the video;
compile at least one first avatar message, wherein the at least one first avatar message comprises the at least one first customized avatar;
receive at least one recipient choice, wherein the at least one recipient choice comprises at least the contact information for at least one recipient;
send the at least one first avatar message to the at least one recipient;
b) a second electronic device associated with the recipient, wherein the second electronic device is operative to:
receive the at least one first avatar message;
load a second electronic device augmented reality software program;
display a second device augmented reality field of view;
display the at least one first avatar message as a bubble notification within the augmented reality field of view;
receive a user selection, wherein the user selects the at least one first avatar message.

8. The system of claim 7, wherein:
the at least one first avatar message further comprises the at least one video file; and
the second electronic device is further operative to play the at least one video file of the at least one first avatar message.

9. The system of claim 7, wherein the first electronic device is further configured to:
associate the at least one video file with the at least one first customized avatar;
extract at least one user movement by the user captured in the video file;
create at least one avatar movement sequence file, wherein the at least one avatar movement sequence file comprises at least one movement by the at least one first customized avatar that mimics the at least one user movement; and compile the at least one avatar movement sequence file, and the at least one first customized avatar into the at least one first avatar message;

wherein the second electronic device is configured to play the at least one avatar movement sequence file of the at least one first avatar message.

10. The system of claim 7, wherein the first electronic device is further configured to send the at least one first avatar message to the at least one recipient as at least one first message bubble notification.

11. The system of claim 7, wherein the first electronic device is further operative to:

view at least one augmented reality shopping bubble notification in the augmented reality field of view;

receive a touchscreen selection of the at least one augmented reality shopping bubble notification;

load an e-commerce platform; and enable the user to shop on the e-commerce platform for at least one product or service.

12. The system of claim 7, wherein the first electronic device is further operative to:

view at least one geogamification bubble notification in the augmented reality field of view;

receive a touchscreen selection of the at least one geogamification bubble notification;

load a geogamification software program; and direct the user to at least one second location.

13. The system of claim 7, wherein the first electronic device is further operative to:

view at least one augmented reality shopping avatar in the augmented reality field of view;

receive a touchscreen selection of the at least one augmented reality shopping avatar;

load an e-commerce platform; and enable the user to shop on the e-commerce platform for at least one product or service.

14. The system of claim 7, wherein the first electronic device is further operative to:

view at least one geogamification avatar in the augmented reality field of view;

receive a touchscreen selection of the at least one geogamification avatar;

load a geogamification software program; and direct the user to at least one second location.

15. A method for avatar-based augmented reality electronic messaging, comprising:

determining, by a first electronic device associated with a first user, a first location;

loading, by the first electronic device, an augmented reality software program;

providing, by the first electronic device, a plurality of avatars;

providing, by the first electronic device, a plurality of avatar customization options;

receiving, by the first electronic device, at least one avatar selection, wherein the at least one avatar selection is at least one avatar selected by the user from the plurality of avatars;

receiving, by the first electronic device, at least one customization selection, wherein the at least one customization selection comprises at least one customization option selected by the user from the plurality of customization options;

compiling, by the first electronic device, at least one customized avatar comprising the at least one customization selection applied to the at least one avatar selection;

displaying, by the dual-facing camera of the first electronic device, a forward field of view;

running, by the first electronic device, the augmented software program such that the front facing field of view comprises an augmented reality field of view;

receiving, by the first electronic device, at least one field of view location selection, wherein the at least one field of view location is within the augmented reality field of view;

displaying, by the first electronic device, the at least one customized avatar at the field of view location;

animating, by the first electronic device, the at least one customized avatar at the field of view location;

maintaining, by the first electronic device, the at least one customized avatar at the field view location;

reorienting, by the first electronic device, the at least one dual-facing camera to a selfie field of view;

receiving, by the first electronic device, a video-start input from the user;

recording, by the first electronic device, a video taken by the dual-facing camera while the dual-facing camera is oriented to the selfie field of view;

receiving, by the first electronic device, a video-stop input from the user;

identifying, by the first electronic device, at least one audio file and at least one video file in the video;

associating, by the first electronic device, the at least one audio file with the at least one customized avatar;

receiving, by the first electronic device, at least one recipient choice, wherein the at least one recipient choice comprises at least the contact information for at least one recipient;

compiling, by the first electronic device, the at least one audio file and the at least one customized avatar into at least one avatar message;

sending, by the first electronic device, the at least one avatar message to the at least one recipient;

receiving, by a second electronic device associated with the recipient, the at least one avatar message;

loading, by the second electronic device, a second electronic device augmented reality software program;

displaying, by the second electronic device, the second device augmented reality field of view;

displaying, by the second electronic device, the at least one avatar message as at least one bubble notification within the second device augmented reality field of view;

receiving, by the second electronic device, a selection by a second user of the at least one avatar message;

viewing, by the second electronic device, the at least one customized avatar within the second device augmented reality field of view; and playing, by the second electronic device, the at least one audio file of the at least one avatar message.

16. The method of claim 15, the method further comprising:

compiling, by the first electronic device, the at least one audio file, the at least one video file, and the at least one customized avatar into at least one avatar message; and playing, by the second electronic device, the at least one video file of the at least one avatar message.

17. The method of claim 16, further comprising:

associating, by the first electronic device, the at least one video file with the at least one first customized avatar;

extracting, by the first electronic device, at least one user movement by the user captured in the video file of the selfie video;

creating, by the first electronic device, at least one avatar movement sequence file, wherein the at least one avatar movement sequence file comprises at least one movement by the at least one first customized avatar that mimics the at least one user movement; and compiling, by the first electronic device, the at least one first audio file, the at least one avatar movement sequence file, and the at least one first customized avatar into the at least one first avatar message;

playing, by the second electronic device, the at least one audio file and the at least one avatar movement sequence file of the at least one first avatar message.

18. The method of claim 15, further comprising:

sending, by the first electronic device, the at least one first avatar message to the at least one recipient as at least one first message bubble notification.

19. The method of claim 15, further comprising:

viewing, by the first electronic device, at least one augmented reality shopping bubble notification in the augmented reality field of view;

receiving, by the first electronic device, a touchscreen selection of the at least one augmented reality shopping bubble notification;

loading, by the first electronic device, an e-commerce platform; and enabling, by the first electronic device, the user to shop on the e-commerce platform for at least one product or service.

20. The system of claim 15, further comprising:

viewing, by the first electronic device, at least one geogamification bubble notification in the augmented reality field of view;

receiving, by the first electronic device, a touchscreen selection of the at least one geogamification bubble notification;

loading, by the first electronic device, a geogamification software program; and directing, by the first electronic device, the user to at least one second location.

* * * * *